United States Patent
Wang et al.

(10) Patent No.: US 11,886,846 B2
(45) Date of Patent: Jan. 30, 2024

(54) METHOD FOR EXECUTING COMPUTATION, COMPUTING DEVICE, COMPUTING SYSTEM, AND STORAGE MEDIUM

(71) Applicant: Shanghai Biren Technology Co., Ltd, Shanghai (CN)

(72) Inventors: HaiChuan Wang, Shanghai (CN); Huayuan Tian, Shanghai (CN); Long Chen, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 116 days.

(21) Appl. No.: 17/686,413

(22) Filed: Mar. 4, 2022

(65) Prior Publication Data
US 2022/0283790 A1    Sep. 8, 2022

(30) Foreign Application Priority Data
Mar. 5, 2021    (CN) .......................... 202110244679.9

(51) Int. Cl.
| | | |
|---|---|---|
| G06F 9/44 | (2018.01) | |
| G06F 8/41 | (2018.01) | |
| G06F 9/30 | (2018.01) | |
| G06F 9/38 | (2018.01) | |

(52) U.S. Cl.
CPC ............ *G06F 8/41* (2013.01); *G06F 9/30054* (2013.01); *G06F 9/30145* (2013.01); *G06F 9/3836* (2013.01)

(58) Field of Classification Search
None
See application file for complete search history.

(56) References Cited

U.S. PATENT DOCUMENTS

| | | | | |
|---|---|---|---|---|
| 10,599,404 | B1 * | 3/2020 | Neto | G06F 8/40 |
| 2014/0026139 | A1 * | 1/2014 | Takahara | G06F 9/54 |
| | | | | 718/102 |
| 2018/0314520 | A1 * | 11/2018 | Tirumala | G06F 9/46 |
| 2019/0377582 | A1 * | 12/2019 | Guérin | G06F 9/3009 |
| 2020/0285473 | A1 * | 9/2020 | Foo | G06F 9/3851 |

* cited by examiner

*Primary Examiner* — Qamrun Nahar
(74) *Attorney, Agent, or Firm* — JCIP GLOBAL INC.

(57) ABSTRACT

A method for executing computation, a computing device, a computing system, and a storage medium are provided. The method includes: confirming, via a compiler, whether there is a call instruction related to a thread block modification request in a kernel function to be compiled; in response to confirming that there is the call instruction related to the thread block modification request in the kernel function to be compiled, determining a corresponding program segment associated with the call instruction; configuring a required thread block and thread local register for the corresponding program segment; and inserting a control instruction into the corresponding program segment to enable the thread block configured for the corresponding program segment to execute relevant computation of the corresponding program segment, and an unconfigured thread block not to execute the relevant computation. The disclosure can improve overall performance, make coding and maintenance easy and reduce error rate of code.

12 Claims, 7 Drawing Sheets

METHOD FOR EXECUTING COMPUTATION, COMPUTING DEVICE, COMPUTING SYSTEM, AND STORAGE MEDIUM

CROSS-REFERENCE TO RELATED APPLICATION

This application claims the priority benefit of China application serial no. 202110244679.9, filed on Mar. 5, 2021. The entirety of the above-mentioned patent application is hereby incorporated by reference herein and made a part of this specification.

BACKGROUND

Technical Field

Embodiments of the disclosure generally relate to the field of information processing, and more particularly to a method for executing computation, a computing device, a computing system, and a storage medium.

Description of Related Art

In a conventional computing device, such as a general-purpose computing on graphics processing unit (GPGPU) computing device, a CPU (central processing unit) side (a host side) starts a code of a GPU device side (a device side) to run. The code of the device side is also commonly referred to as a kernel function. The GPU starts thousands of threads at the same time to execute computation when executing large-scale and highly concurrent computing tasks. In order to effectively coding and execute concurrent tasks, when the kernel function is started, large-scale thread blocks corresponding to the concurrent tasks are organized by a program code according to a certain topological structure. For example, the existing NVIDIA CUDA uses grids and thread blocks to organize threads; and in OpenCL programming, NDRange and WorkGroup are used for organization.

In the conventional solutions for executing computations, if the kernel function is started to run, the topological structure of the thread block (for example, the size or the three-dimensional size of the thread block) is generally not changed. In real applications, a complete GPU computing task often requires different topologies of thread blocks for computing. For example, for an AI computing task, a thread block in the first step uses 8×8×8 for convolution computation, and 512 threads are required to participate in the execution at this time. A thread block in the second step uses 32×32 for a fully connected matrix operation, and 1024 threads are required to participate in the execution at this time. In the conventional solutions for executing computations, the topological structure of the thread block is usually not changed after the kernel function is started. Therefore, the following two methods are usually adopted for the above computing task that needs to change the topological structure of the thread block. The first method includes, for example, dissecting the computing task into multiple kernel functions. For example, the first kernel function is used to start the 8×8×8 convolution computation, and the second kernel function is used to start the 32×32 fully connected matrix operation. The two kernel functions are sequentially executed, so that the 512 threads and the 1024 threads respectively participate in the execution when the first kernel function and the second kernel function are started and run. The second method includes, for example, not using the topological structure of the thread block provided by the GPGPU, but directly using a thread physical index for programming. The first method may easily cause high overhead for starting the kernel function multiple times, consumes memory to store intermediate results, wastes memory bandwidth, and increases data delay. In the second method, the number of the thread no longer has the properties of the task assignment topology. The user needs to compute the mapping of the number of the thread to the task topology by himself, thereby increasing programming complexity. At the same time, when one thread may process multiple data points, the task assignment is complex and not necessarily balanced. Some threads may process more data points, and some may process fewer data points, which causes difficulty in coding and heavy workload, and is prone to errors.

In summary, the disadvantages of the conventional solutions for executing computations are that for computing tasks that need to change the topological structure of the thread block, overhead may easily be high for starting the kernel function multiple times, memory bandwidth is wasted, data delay is increased, etc., causing computing performance to be poor or coding to be difficult and prone to errors.

SUMMARY

The disclosure provides a method for executing computation, a computing device, a computing system, and a computer-readable storage medium, which can improve the overall performance of the computing device for the above computing task that needs to change the topological structure of the thread block, so that coding and maintenance are easy, and the error rate of the code is reduced.

According to a first aspect of the disclosure, a method for executing computation is provided. The method includes the following steps. Whether there is a call instruction related to a thread block modification request in a kernel function to be compiled is confirmed via a compiler. In response to confirming that there is the call instruction related to the thread block modification request in the kernel function to be compiled, a corresponding program segment associated with the call instruction is determined. A required thread resource is configured for the corresponding program segment. A control instruction is inserted into the corresponding program segment to enable the thread resource configured for the corresponding program segment to execute relevant computation of the corresponding program segment, and an unconfigured thread resource does not execute the relevant computation.

According to a second aspect of the disclosure, a computing device is also provided. The computing device includes at least one processor and a memory communicatively connected to the at least one processor. The memory stores an instruction executable by the at least one processor, so that the computing device can execute the method according to the first aspect of the disclosure.

According to a third aspect of the disclosure, a computer-readable storage medium is also provided. The computer-readable storage medium stores a computer program, and when the computer program is executed by a machine, the method according to the first aspect of the disclosure is executed.

According to a fourth aspect of the disclosure, a computing system is also provided. The computing system includes a compiler module, configured to identify a call instruction related to a thread block modification request included in a received kernel function to be compiled, and to convert the kernel function to be compiled of the call instruction to generate a compiled kernel function, wherein a corresponding program segment included in the compiled kernel function is configured with a control instruction; a driver module, configured to determine a maximum number of threads required by the compiled kernel function to start based on the compiled kernel function; and an execution unit computation core module, configured to modify a function call of a thread block in response to the control instruction of the corresponding program segment in the compiled kernel function being executed.

In some embodiments, the step of determining the corresponding program segment associated with the call instruction includes the following. The kernel function to be compiled is divided into multiple corresponding program segments based on a number of call instructions.

In some embodiments, the step of configuring the required thread resource for the corresponding program segment includes the following. A required thread block and thread local register are configured for each of the corresponding program segments.

In some embodiments, the method for executing computation further includes the following steps. In response to confirming that the compiled kernel function is started, the driver confirms a maximum number of threads required by the compiled kernel function. The compiled kernel function includes multiple corresponding program segments respectively inserted with the control instruction. The execution unit computation core module starts the maximum number of threads.

In some embodiments, the method for executing computation further includes the following steps. In response to the control instruction of the corresponding program segment being called, all threads of a thread block configured for the corresponding program segment are synchronized; a thread local register is assigned for each of the threads of the configured thread block; and a numbering of each of the threads is reconfigured, so that the reconfigured numbering is written to the assigned thread local register.

In some embodiments, the method for executing computation further includes the following steps. The compiled kernel function is started via a driver. The maximum number of threads required by the compiled kernel function is confirmed via the compiler or the driver. The maximum number of threads is requested from a graphics processor via the driver.

In some embodiments, the step of enabling the thread resource configured for the corresponding program segment to execute the relevant computation of the corresponding program segment includes the following. An executive stream is controlled through a control flow code to encapsulate the corresponding program segment, so that if a thread identifier of a current thread is determined to belong to a thread block identifier set configured for the corresponding program segment, the current thread is used to execute the relevant computation of the corresponding program segment; and if the thread identifier of the current thread is determined to not belong to the thread block identifier set configured for the corresponding program segment, the current thread is skipped.

In some embodiments, the step of confirming whether there is the call instruction related to the thread block modification request in the kernel function to be compiled includes the following. The kernel function to be compiled is scanned via the compiler to confirm whether the kernel function to be compiled includes the call instruction related to the thread block modification request. The call instruction related to the thread block modification request indicates a thread configuration required by the corresponding program segment.

In some embodiments, the driver module is configured in a central processor, the execution unit computation core module is configured in a graphics processor, and the central processor and the graphics processor are included in the computing system.

In some embodiments, the compiler module is further configured to execute the following. If the kernel function to be compiled is confirmed to include the call instruction related to the thread block modification request, a required thread resource is configured for the corresponding program segment associated with the call instruction. The control instruction is inserted into the corresponding program segment to enable the thread resource configured for the corresponding program segment to execute relevant computation of the corresponding program segment, and an unconfigured thread resource does not execute the relevant computation.

In some embodiments, the action of modifying the function call of the thread block includes the following. A thread is resumed or paused, and a thread local register is assigned for each configured thread.

It should be understood that what is described in this section is not intended to identify key or critical features of the embodiments of the disclosure, nor is it intended to limit the scope of the disclosure. Other features of the disclosure will become readily understood from the following description.

BRIEF DESCRIPTION OF THE DRAWINGS

The accompanying drawings are used for better understanding of the disclosure and do not constitute a limitation to the disclosure.

In the drawings, the same or similar reference numerals are used to refer to the same or similar elements.

DETAILED DESCRIPTION OF DISCLOSED EMBODIMENTS

Figure 1:
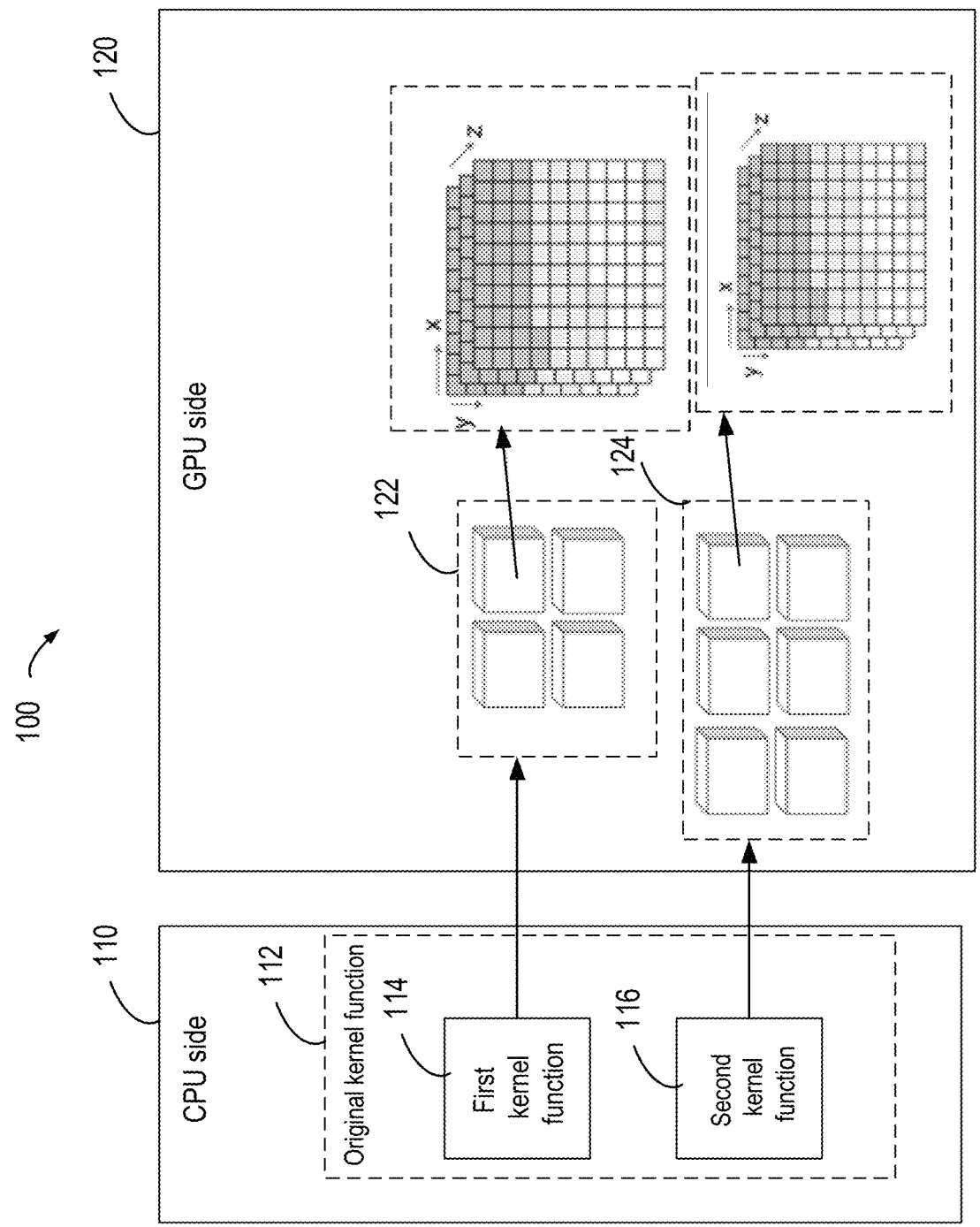
FIG. 1 is a schematic diagram of a conventional computing device.

Preferred embodiments of the disclosure will be described in more detail below with reference to the accompanying drawings. Although preferred embodiments of the disclosure are shown in the drawings, it should be understood that the disclosure may be embodied in various forms and should not be limited by the embodiments set forth herein. Rather, the embodiments are provided for the disclosure to be more thorough and complete and to fully convey the scope of the disclosure to persons skilled in the art.

As used herein, the term "including" and variations thereof mean open-ended inclusion, that is, "including but not limited to". The term "or" means "and/or" unless specifically stated otherwise. The term "based on" means "at least partially based on". The terms "an exemplary embodiment" and "an embodiment" mean "at least one exemplary embodiment". The term "another embodiment" means "at least one additional embodiment". Terms such as "first" and "second" may refer to different objects or the same object.

As described above, in the conventional solution for executing computation, for a computing task that needs to change the topological structure of a thread block, a kernel function corresponding to the computing task is usually dissected into many kernel functions. FIG. 1 is a schematic diagram of a conventional computing device. As shown in FIG. 1, a computing device 100 at least includes a CPU side 110 (also referred to as a host side) and a GPU side 120 (also referred to as a device side). It is assumed that the name of an original kernel function 112 executed by the CPU side 110 is, for example, processImage. The first step of the original kernel function 112, for example, needs to use a thread block shown in a grid 122 with a first topological structure for convolution computation. The second step of the original kernel function 112, for example, needs to use a thread block shown in a grid 24 with a second topological structure to for a fully connected matrix operation. In order to solve the issue that the computing task requires different topologies of thread blocks for computation, the conventional solution for executing computation, for example, dissects the original kernel function 112 into a first kernel function 114 and a second kernel function 116. For example, when the first kernel function 114 is started through code "procesImage<<<dim3(2,2,1), dim3(10,10,3)>>>( . . . )", a first computing task (such as the convolution computation) has 2×2×1 thread blocks at the grid 122 level, and each thread block has, for example, 10×10×3 threads participating in the execution. Then, when the second kernel function 116 is started, for example, through code "procesImage<<<dim3(3,2,1), dim3(10,10,3)>>>( . . . )", a second computing task (such as the fully connected matrix operation) has 3×2×1 thread blocks at the grid 124 level, and each thread block has, for example, 10×10×3 threads participating in the execution. In this way, computations that satisfy different grid sizes through starting two kernel functions are implemented. However, the above method needs to dissect a kernel function into multiple kernel functions, thereby causing high overhead for starting the kernel function multiple times. At the same time, the starting of the kernel function is delayed and resources of the GPU control panel (CP) are occupied. In addition, output data of each kernel function needs to be written from a GPU computation core to a memory, and then read back to the GPU computation core after the next kernel function is started, which consumes memory to store intermediate results, wastes memory bandwidth, increases data delay, and is not conducive to the improvement of the overall performance of the computing device.

To at least partially address the above issue and one or more other potential issues, exemplary embodiments of the disclosure propose a method for executing computation, a computing device, a computing system, and a computer-readable storage medium. In the method of the disclosure, when confirming whether there is a call instruction related to a thread block modification request in a kernel function to be compiled through a compiler, a corresponding program segment associated with the call instruction is determined; a required thread resource is configured for the corresponding program segment; and a control instruction is inserted into the corresponding program segment to enable the thread resource configured for the corresponding program segment to execute relevant computation of the corresponding program segment, and an unconfigured thread resource does not execute the relevant computation. The disclosure can dynamically modify the size (also referred to as "the number of thread blocks") and the topological structure of the thread block within the kernel function, may still use built-in coordinate information of the thread block for data access, and does not need to start the kernel function multiple times to satisfy the requirement of the computing task that needs to change the topological structure of the thread block. Therefore, in the disclosure, the number of times that the kernel function is started is reduced, the code is more concentrated, the performance is better, it is convenient for a programmer or a compiler to perform boundary checking, and the error rate of the code is reduced. Therefore, the disclosure can improve the overall performance of the computing device for the computing task that needs to change the topological structure of the thread block, so that coding and maintenance are easy, and the error rate of the code is reduced.

Figure 2:
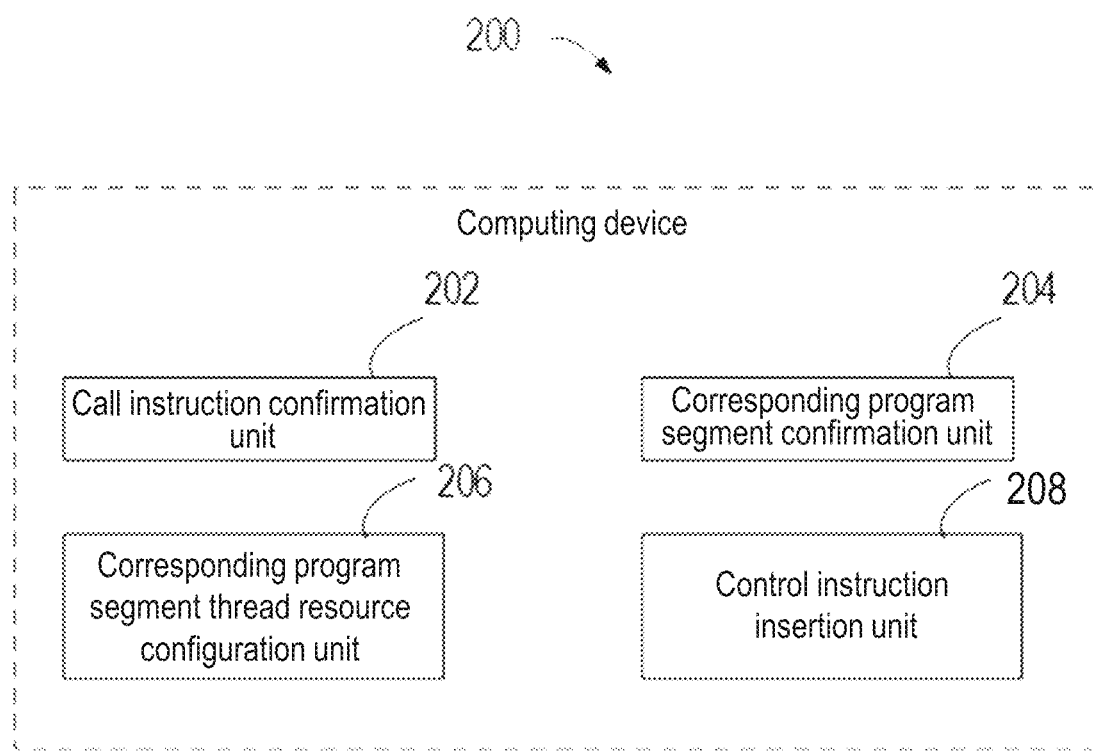
FIG. 2 is a schematic diagram of a computing device for implementing a method for executing computation according to an embodiment of the disclosure.

FIG. 2 is a schematic diagram of a computing device 200 for implementing a method for executing computation according to an embodiment of the disclosure.

As shown in FIG. 2, the computing device 200 is used to execute a computing task that needs to change the topological structure of a thread block. The computing device 200 includes a call instruction confirmation unit 202, a corresponding program segment confirmation unit 204, a corresponding program segment thread resource configuration unit 206, and a control instruction insertion unit 208. The computing device 200 further includes, for example, at least one processor (at least one graphics processor and at least one central processor, not shown) and a memory (not shown) communicatively connected to the at least one processor. The memory stores an instruction executable by the at least one processor, and the instruction is executed by the at least one processor. The computing device 200 also includes, for example, a compiler.

The call instruction confirmation unit 202 is used to confirm whether there is a call instruction related to a thread block modification request in a kernel function to be compiled via a compiler.

The corresponding program segment confirmation unit 204 is used to determine a corresponding program segment associated with the call instruction in response to confirming that there is the call instruction related to the thread block modification request in the kernel function to be compiled.

The corresponding program segment thread resource configuration unit 206 is used to configure a required thread resource for the corresponding program segment. The configured thread resource is, for example, a thread local register (abbreviated as TLR), a warp scalar register (abbreviated as WSR), and a constant register (abbreviated as CSR).

The control instruction insertion unit 208 is used to insert a control instruction into the corresponding program segment to enable the thread resource configured for the corresponding program segment to execute relevant computation of the corresponding program segment, and an unconfigured thread resource does not execute the relevant computation.

Figure 3:
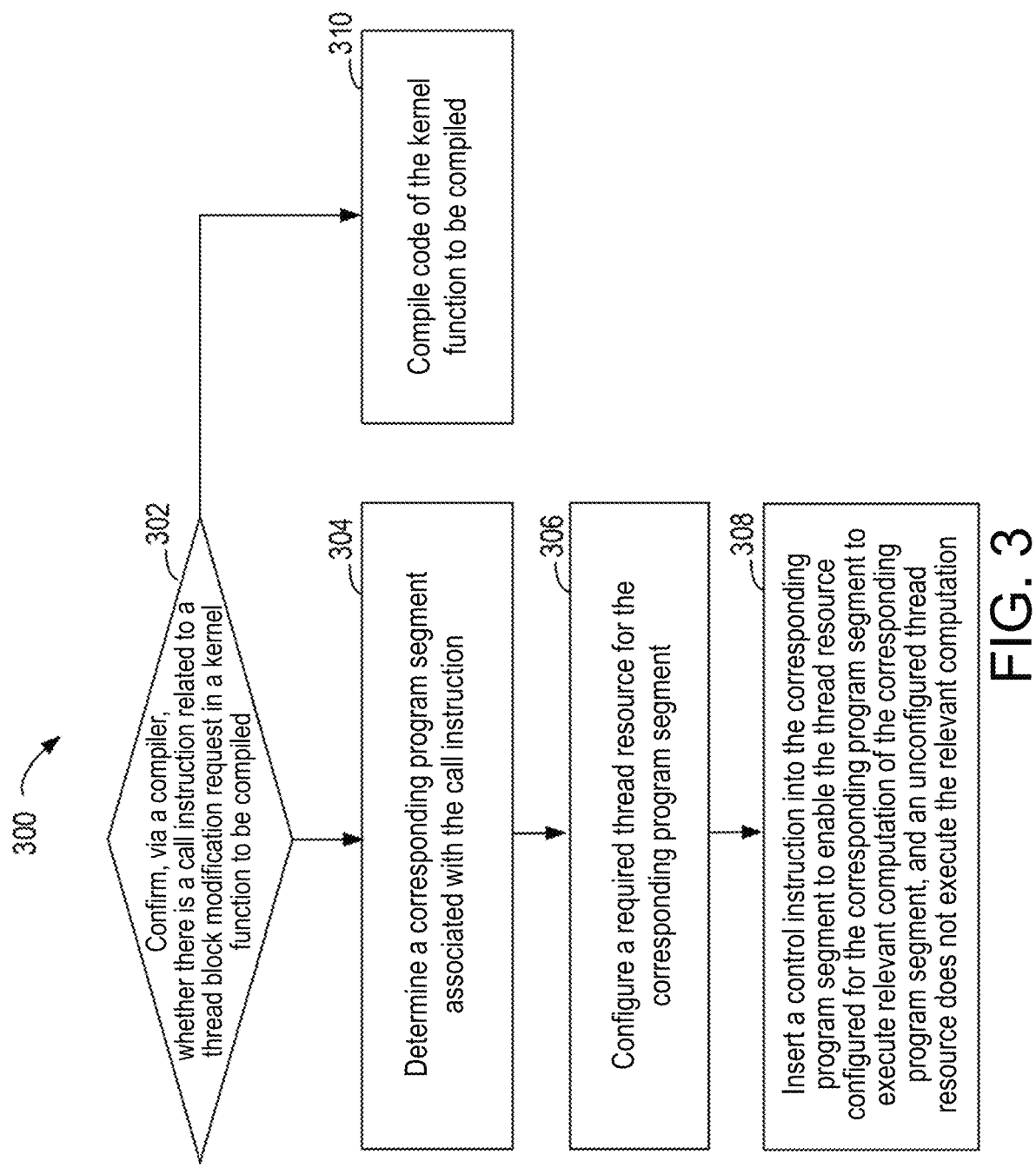
FIG. 3 is a flowchart of a method for executing computation according to some embodiments of the disclosure.
Figure 4:
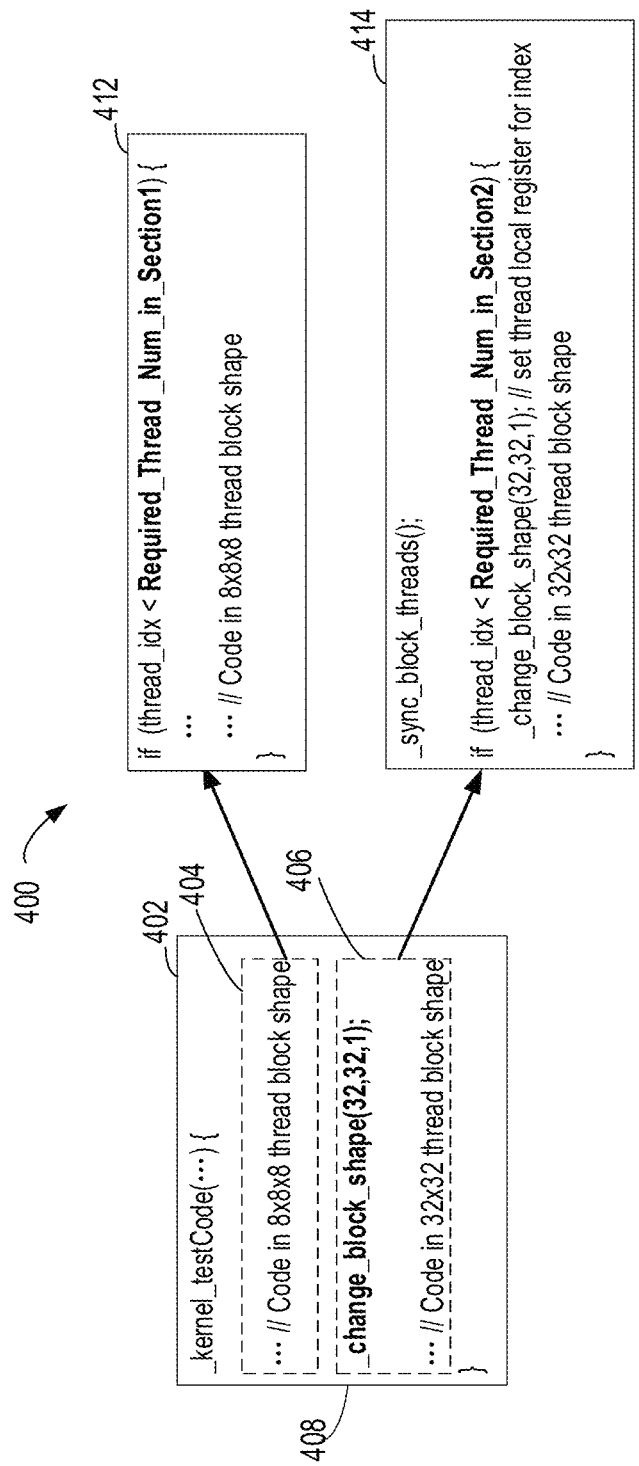
FIG. 4 is a schematic diagram of a kernel function according to some embodiments of the disclosure.

A method 300 for executing computation is described below in conjunction with FIG. 3 and FIG. 4. FIG. 3 is a flowchart of a method 300 for executing computation according to some embodiments of the disclosure. FIG. 4 is a schematic diagram of a kernel function according to some embodiments of the disclosure. It should be understood that the method 300 may be executed, for example, by the computing device 200 described in FIG. 2. It should be understood that the method 300 may also include additional components and actions not shown and/or may omit the components and actions shown, and the scope of the disclosure is not limited in this regard.

In step 302, whether there is a call instruction related to a thread block modification request in a kernel function to be compiled is confirmed via a compiler. For example, the kernel function to be compiled is scanned via the compiler to confirm whether the kernel function to be compiled includes the call instruction related to the thread block modification request. The call instruction related to the thread block modification request indicates a thread configuration required by the corresponding program segment. If there is no call instruction related to the thread block modification request is confirmed, skip to step 310 to compile the code of the kernel function.

For example, a kernel function to be compiled 402 shown in FIG. 4, that is, testCode( ), includes two code parts, a first code part 404 requires 8×8×8, that is, 512 threads to participate in the execution, and a second part code 406 requires 32×32, that is, 1024 threads to participate in the execution. The compiler scans the entire kernel function to be compiled 402, and determines whether there is a call instruction 408 related to the thread block modification request. The call instruction 408 is, for example but not limited to, change_block_shape( ). The call instruction 408 indicates, for example, an adjusted thread resource configuration.

Modifying a thread block includes, for example but not limited to, modifying the number of threads in the thread block and/or modifying the organizational topological structure of multiple threads. In step 304, in response to confirming that there is the call instruction related to the thread block modification request in the kernel function to be compiled, a corresponding program segment associated with the call instruction is determined.

The method for determining the corresponding program segment associated with the call instruction includes, for example, dividing the kernel function to be compiled into multiple corresponding program segments based on the number of call instructions if the compiler confirms that there is the call instruction related to the thread block modification request in the kernel function to be compiled. For example, if the compiler confirms that there are N call instructions related to the thread block modification request, the code of the kernel function to be compiled is divided into N+1 corresponding code segments. The compiler determines the thread block and the thread local register assigned for each corresponding program segment. For example, if the compiler confirms that the kernel function to be compiled 402 includes the call instruction 408 related to the thread block modification request, the kernel function is divided into 2 corresponding program segments, that is, a first corresponding program segment 412 and a second corresponding program segment 414 based on, for example, the number of call instructions 408, such as 1.

In step 306, a required thread resource is configured for the corresponding program segment. For example, the compiler configures the required thread block and thread local register for each of the corresponding program segments. For example, the compiler determines that the first corresponding program segment 412 requires 8×8×8, that is, 512 threads to participate in the execution, and the second corresponding program segment 414 requires 32×32, that is, 1024 threads to participate in the execution.

In step 308, a control instruction is inserted into the corresponding program segment to enable the thread resource configured for the corresponding program segment to execute relevant computation of the corresponding program segment, and an unconfigured thread resource does not execute the relevant computation.

The method for inserting the control instruction into the corresponding program segment includes, for example, controlling an executive stream through a control flow code to encapsulate the corresponding program segment, so that if a thread identifier of a current thread is determined to belong to a thread block identifier set configured for the corresponding program segment, the current thread is used to execute the relevant computation of the corresponding program segment; and if the thread identifier of the current thread is determined to not belong to the thread block identifier set configured for the corresponding program segment, the current thread is skipped. The control flow code includes, for example but not limited to, "if . . . else" code, "Switch" code, "go to" code, etc. The control instruction, for example, as shown in the second corresponding program segment 414 in FIG. 4, includes synchronizing all threads of the assigned thread block (the corresponding code is, for example, "_sync_block_threads( )"). If the current thread identifier is determined to belong to (for example, less than) the thread identifier set (the corresponding code is, for example, "if (thread_idx<Required_Thread_in_Section2)") assigned for the corresponding program segment (for example, the second corresponding program segment 414), the thread local register (the corresponding code is, for example, "set TLR for index") is assigned for each thread of the assigned thread block. The numbering of each thread (for example, 32×32 threads) is reconfigured, so that the reconfigured numbering is stored in the thread local register (the corresponding code is, for example, "Code in 32×32 thread block shape"). The code of the corresponding program segment inserted with the control instruction is, for example, as follows, wherein the symbol " . . . " represents other codes not shown.

```
"_sync_block_threads( )
if(thread_idx<Required_Thread_in_Section2){
_change_block_shape(32,32,1);//set Thread local register for index
...//Code in 32×32 thread block shape
}".
```

In the above solution, when confirming that there is the call instruction related to the thread block modification request in the kernel function to be compiled through the compiler, the corresponding program segment associated with the call instruction is determined; the required thread resource is configured for the corresponding program segment; and the control instruction is inserted into the corresponding program segment to enable the thread resource configured for the corresponding program segment to execute the relevant computation of the corresponding program segment, and the unconfigured thread resource does not execute the relevant computation. The disclosure can dynamically modify the size and the topological structure of the thread block within the kernel function, may still use built-in coordinate information of the thread block for data access, and does not need to start the kernel function multiple times to satisfy the requirement of the computing task that needs to change the topological structure of the thread block. Therefore, in the disclosure, the number of times that the kernel function is started is reduced, the code is more concentrated, the performance is better, it is convenient for a programmer or a compiler to perform boundary checking, and the error rate of the code is reduced. Therefore, the disclosure can improve the overall performance of the computing device for the computing task that needs to change the topological structure of the thread block, so that coding and maintenance are easy, and the error rate of the code is reduced.

In some embodiments, the method 300 further includes starting a compiled kernel function via a driver; confirming the maximum number of threads required by the compiled kernel function via the compiler or the driver; and requesting the maximum number of threads from a graphics processor via the driver.

In some embodiments, the method 300 further includes the following steps. In response to confirming that the compiled kernel function is started, the driver confirms the maximum number of threads required by the compiled kernel function. The compiled kernel function includes multiple corresponding program segments respectively inserted with the control instruction. The execution unit computation core module starts the maximum number of threads. For example, after the compiled kernel function is started, the execution unit computation core module (hardware) starts the maximum number of threads (the maximum number of threads is determined, for example, by the compiler or the driver) required by the compiled kernel function. The maximum number of threads is, for example, 1024 threads. When the first corresponding program segment is executed, for example, only 512 threads are used. The 512 threads that need to be used are numbered and organized according to 8×8×8. At the same time, other thread resources, such as the thread local registers (TLRs), of the execution unit computation core module are assigned to the 512 threads. The remaining 512 threads are directly suspended to wait for the second corresponding program segment to be executed. After the first corresponding program segment is executed and _change_block_shape(32,32,1) is performed, all threads are stopped. Then, all threads are activated. Then, the execution unit computation core module also correspondingly assigns other thread resources (such as the TLRs) to all of the 1024 threads according to the new topology number, such as 32×32. In this way, when the second corresponding program segment is executed, the thread topology of the thread block is dynamically modified. The thread topological structure of the thread block is modified, for example, by assigning the thread local registers (TLRs) according to the modified thread topology of the thread block through a barrier register. Also, TLR, WSR, and CSR are configured for the numbering of the thread and the size of the thread block. The barrier register will be described below with reference to FIG. 7 and is not repeated here.

Figure 5:
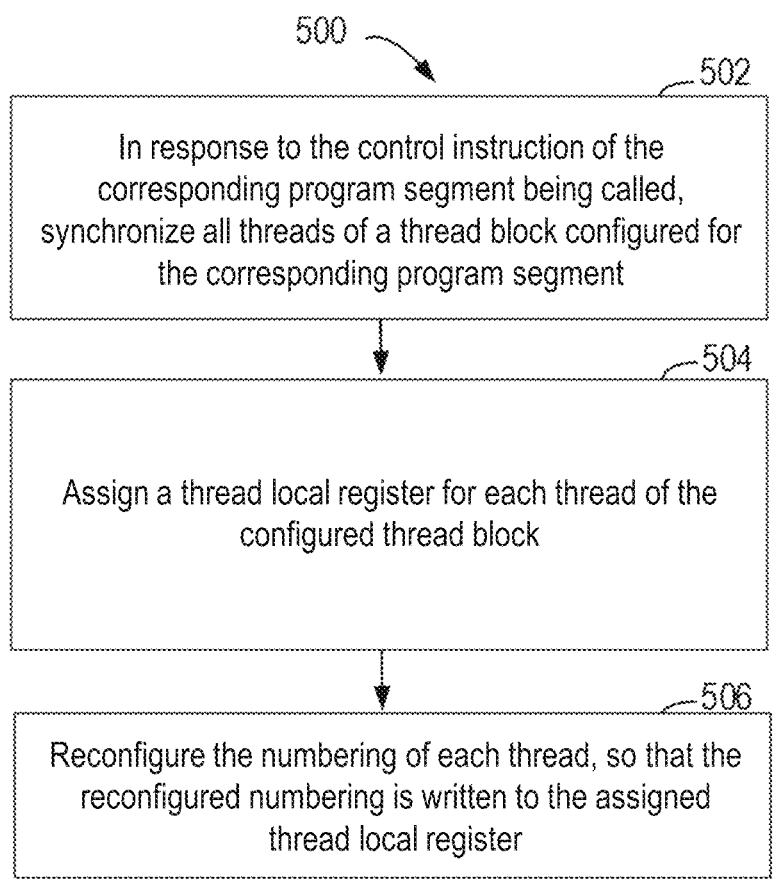
FIG. 5 is a flowchart of a method for executing a control instruction according to some embodiments of the disclosure.

In some embodiments, the method 300 also includes a method 500 for executing the control instruction of the corresponding program segment. FIG. 5 is a flowchart of the method 500 for executing the control instruction according to some embodiments of the disclosure. It should be understood that the method 500 may be executed, for example, by the computing device 200 described in FIG. 2. It should be understood that the method 500 may also include additional components and actions not shown and/or may omit the components and actions shown, and the scope of the disclosure is not limited in this regard.

In step 502, in response to the control instruction of the corresponding program segment being called, all threads of a thread block configured for the corresponding program segment are synchronized.

The adjustment of the numbering of the thread and the assignment of the thread local register for each thread configured for the corresponding program segment need to be performed at the same time. Therefore, all threads need to wait for the synchronization point to be synchronized.

In step 504, a thread local register is assigned for each thread of the configured thread block. After synchronization is performed for each thread configured for the corresponding program segment, the numbering of each thread is adjusted, and the thread local register is assigned for each thread.

For the method for assigning the thread local register for each thread, for example, according to the general design of existing GPUs, the total number of thread local registers (TLRs) of a thread block is fixed. The more the number of threads started, the fewer the number of thread local registers assigned for each thread. For example, a thread block has a total of K TLRs. If N threads are started, each thread has K/N TLRs. If 2N threads are started, each thread has only K/2N TLRs.

For the method for dividing the thread local registers, for example, a complete thread local register may be seen by each thread, and the complete thread local register that may be seen by each thread is numbered starting from a register address 0.

In step 506, the numbering of each thread is reconfigured, so that the reconfigured numbering is written to the assigned thread local register. For the method for reconfiguring the numbering of each thread, for example, before the adjustment, the numbering of the thread is, for example, from (0,0,0), (0,0,1), to (7,7,7), which are recorded in the thread local registers. After modifying the number of thread local registers and threads, the numbering of each thread needs to be reset, such as from (0,0), (0,1), to (31,32). In the step, new coordinates of each thread are recalculated according to an absolute physical address of the thread, and are then written to the thread local registers.

Through adopting the above technical means, the disclosure can implement dynamic adjustment of a thread block shape through the starting of one kernel function, thereby dynamically supporting the execution of the computing task that needs thread blocks with various shapes.

Figure 6:
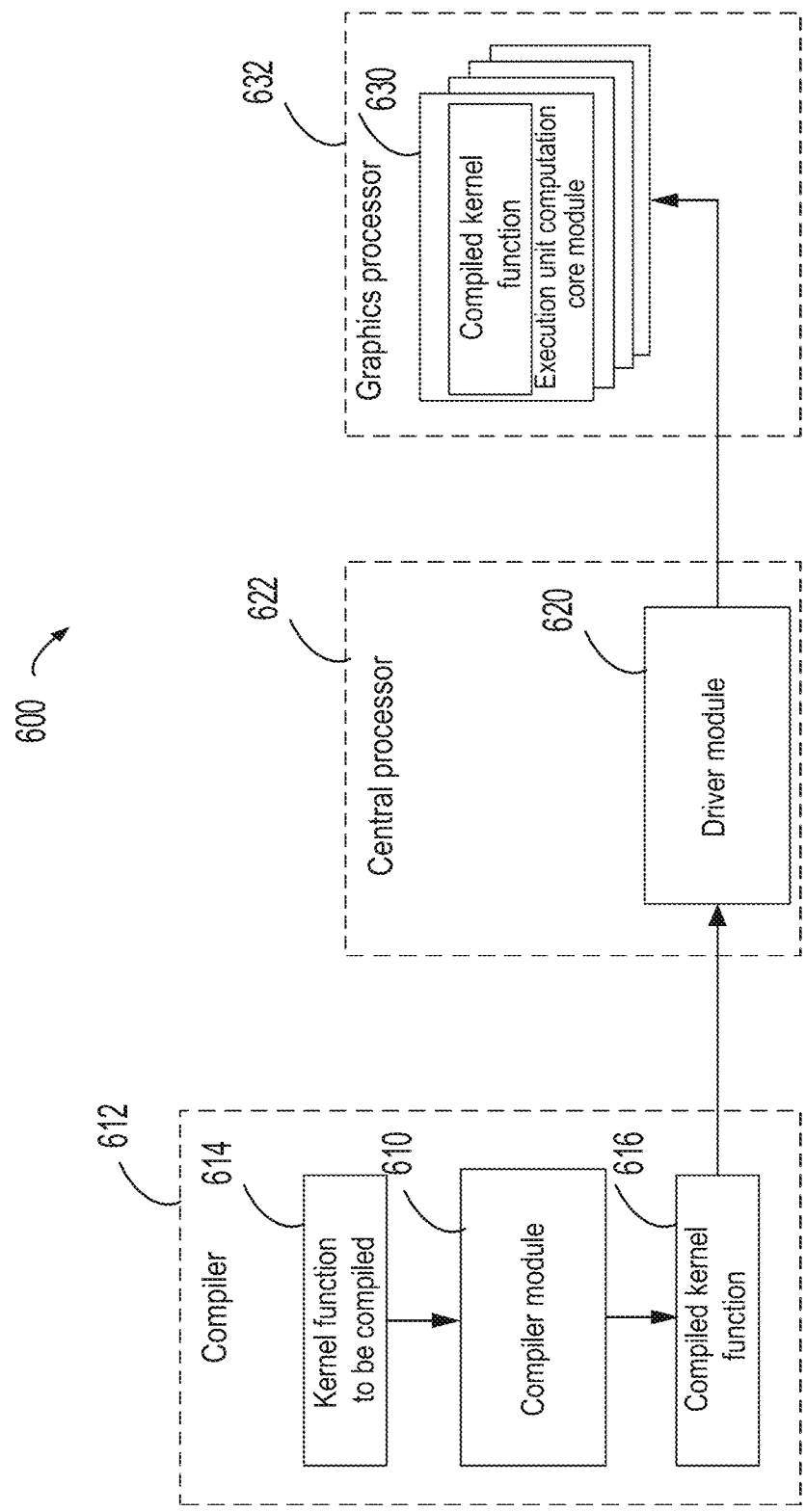
FIG. 6 is a schematic diagram of a computing system for implementing a method for executing computation according to an embodiment of the disclosure.

FIG. 6 is a schematic diagram of a computing system 600 for implementing a method for executing computation according to an embodiment of the disclosure. It should be understood that the computing system 600 may also include additional components not shown, and the scope of the disclosure is not limited in this regard.

As shown in FIG. 6, the computing system 600 at least includes a compiler module 610, a driver module 620, and an execution unit computation core module 630. The computing system 600 also includes a compiler 612, a central processor 622, and a graphics processor 632. For example, the compiler module 610 is, for example, configured in the compiler 612, the driver module 620 is, for example, in at the central processor 622, and the execution unit computation core module 630 is, for example, configured in the graphics processor 632.

The compiler module 610 is configured to identify a call instruction related to a thread block modification request included in a received kernel function to be compiled 614, and to convert the kernel function to be compiled of the call instruction to generate a compiled kernel function 616. A corresponding program segment included in the compiled kernel function is configured with a control instruction.

Regarding the conversion of the kernel function including the call instruction related to the thread block modification request, the compiler module 610 is configured to configure a thread resource required for the corresponding program segment associated with the call instruction if the kernel function to be compiled is confirmed to include the call instruction related to the thread block modification request; and insert the control instruction into the corresponding program segment to enable the thread resource configured for the corresponding program segment to execute relevant computation of the corresponding program segment, and an unconfigured thread resource does not execute the relevant computation.

The driver module 620 is used to determine the maximum number of threads required by the compiled kernel function to start based on the compiled kernel function 616. For example, the driver module 620 needs to check the maximum number of threads required in the entire compiled kernel function 616. For example, the entire compiled kernel function 616 includes two segments, a first corresponding program segment requires 512 threads (8×8×8), and a second corresponding program segment requires 1024 threads (32×32). Then, when the compiled kernel function 616 is started, the driver module 620 needs to request the number of GPU threads according to the number of 1024 threads. It should be noted that in the first corresponding program segment of the compiled kernel function 616, the driver module 620 only configures coordinates and thread local registers of the 512 threads required by the first corresponding program segment to participate in the execution of the relevant computation. The configuration after the second corresponding program segment dynamically modifies a function call of the thread block in the execution unit computation core module after being started through the control instruction. Modifying a thread block includes, for example but not limited to, modifying the number of threads in the thread block and/or modifying the organizational topological structure of multiple threads.

The execution unit computation core module 630 is configured to modify the function call of the thread block in response to the control instruction of the corresponding program segment in the compiled kernel function 616 being executed. Modifying the function call of the thread block includes resuming or pausing a thread, and assigning a thread local register to each thread.

By adopting the above means, the disclosure can dynamically modify the size and the topological structure of the thread block within the kernel function, thereby reducing the number of times that the kernel function is started, the code is more concentrated, the performance is better, it is convenient for the programmer or the compiler to perform boundary checking, and the error rate of the code is reduced. Therefore, the disclosure can improve the overall performance of the computing device for the computing task that needs to change the topological structure of the thread block, so that coding and maintenance are easy, and the error rate of the code is reduced.

Figure 7:
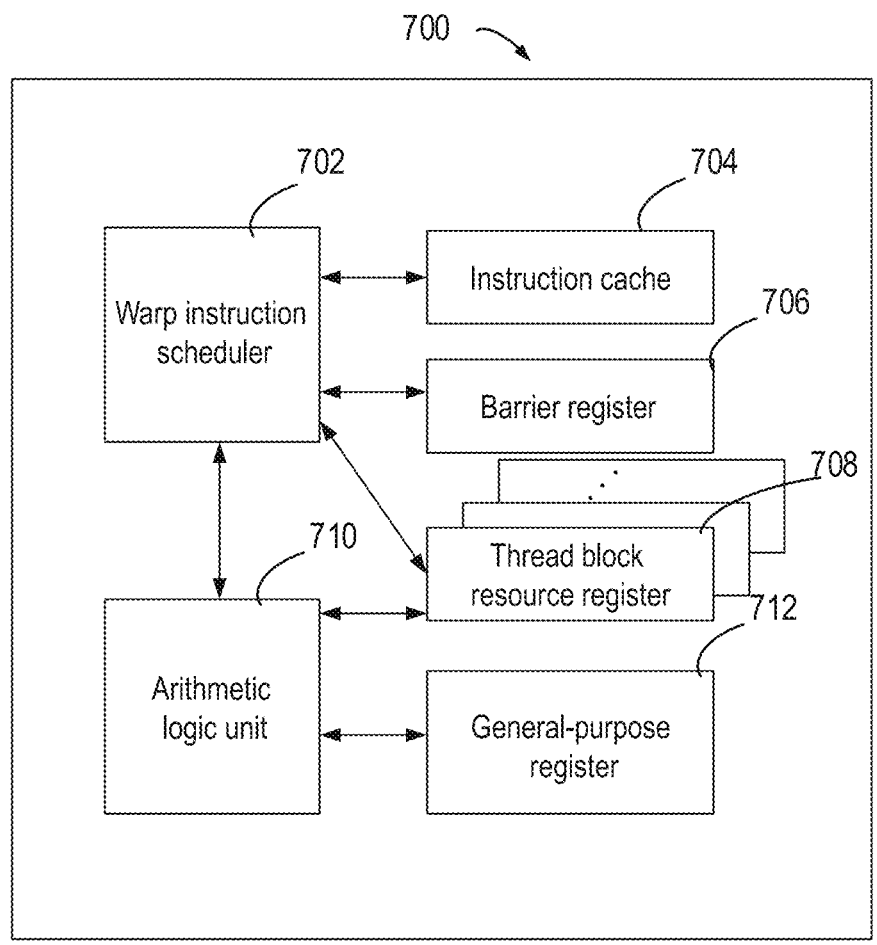
FIG. 7 is a schematic diagram of a graphics processor according to an embodiment of the disclosure.

A graphics processor 700 will be described below with reference to FIG. 7. FIG. 7 is a schematic diagram of the graphics processor 700 according to an embodiment of the disclosure. The graphics processor 700 includes, but is not limited to, a warp instruction scheduler 702, an instruction cache 704, a barrier register 706, a resource-per-warp register 708, an arithmetic logic unit (ALU) 710, and a general-purpose register (GPR) 712. The general-purpose register 712 may be the TLR.

The instruction cache 704 is used to store multiple instructions of the kernel function.

The warp instruction scheduler 702 is used to fetch a series of instructions for each thread block to be stored in the instruction cache 704, and obtain an instruction to be executed from the instruction cache for each thread block according to a program counter. For example, each thread block has an independent program counter (PC) register for recording an instruction location (that is, an instruction address) currently being executed. Each time an instruction is fetched from the instruction cache for a thread block, the corresponding program counter register is incremented by one. The warp instruction scheduler 702 may send the instruction to the arithmetic logic unit 710 for execution. The instructions are defined in an instruction set architecture (ISA). The warp instruction scheduler 702 may enable each thread block to be responsible for processing multiple instructions of a specified segment in the same kernel function according to a related instruction in the kernel function.

The arithmetic logic unit 710 may execute various operations. During the process of executing an operation, the arithmetic logic unit 710 may read data from a specified location (also referred to as a source address) of the general-purpose register 712, and write back an execution result to a specified location (also referred to as a destination address) of the general-purpose register.

The barrier register 706 may be used, for example, to enable a software to synchronize executions between different thread blocks.

The resource-per-warp register 708 may be used to enable the software to use a spatial scope of the general-purpose register when dynamically configuring each thread resource. The resource-per-warp register 708 stores, for example, information of a base location of each thread block. Each base location points to a specific address of the general-purpose register 712. In order to enable different thread blocks to access non-overlapping storage space in the general-purpose register 712, the software may dynamically change the content of the resource-per-warp register 708 for setting the base location of each thread block. For example, the software may divide the general-purpose register 712 into corresponding blocks for multiple thread blocks to respectively correspond to the thread blocks. The software may set the content of the resource-per-warp register 708 before or at the beginning of the execution of the kernel function for pointing to the base address associated with each thread block in the general-purpose register 712. After the warp instruction scheduler 702 fetches the instruction from the instruction cache 704 for the $i^{th}$ thread block, the source address and the destination address of the instruction may be adjusted according to the content of the $i^{th}$ resource-per-warp register for mapping to the storage space dynamically configured for the $i^{th}$ thread block in the general-purpose register 712.

The various processes and processes described above, for example, the methods 300 and 500, may be executed by a computing device. The computing device includes, for example, at least one processor (at least one graphics processor and at least one central processor) and a memory communicatively connected to the at least one processor. The memory stores an instruction executable by the at least one processor, and the instruction is executed by the at least one processor. In some embodiments, the methods 300 and 500 may be implemented as computer software programs, which are tangibly included in a machine-readable medium. In some embodiments, a part or all of the computer program may be loaded to and/or installed on the computing device via a ROM (read only memory) and/or a communication unit. When the computer program is loaded to the RAM (random access memory) and is executed by a GPU and a CPU, one or more actions of the methods 300 and 500 described above may be executed.

The disclosure may be a method, an apparatus, a system, and/or a computer program product. The computer program product may include a computer-readable storage medium, which is loaded with a computer-readable program instruction for executing various aspects of the disclosure. The computer-readable storage medium may be a tangible device that may hold and store an instruction for use by an instruction execution device. The computer-readable storage medium may be, for example but not limited to, an electrical storage device, a magnetic storage device, an optical storage device, an electromagnetic storage device, a semiconductor storage device, or any suitable combination of the above.

The computer-readable program instruction described herein may be downloaded from the computer-readable storage medium to various computing/processing devices or to an external computer or external storage device through a network, such as the Internet, a local area network, a wide area network, and/or a wireless network. Aspects of the disclosure are described herein with reference to the flowcharts and/or the block diagrams of the method, the apparatus (systems), and the computer program product according to the embodiments of the disclosure. It should be understood that each block in the flowcharts and/or the block diagrams and combinations of blocks in the flowcharts and/or the block diagrams may all be implemented by the computer-readable program instruction.

The computer-readable program instructions may be provided to a central processing unit of a general-purpose computer, a special-purpose computer, or other programmable data processing apparatuses, thereby generating a machine, so that when the instructions are executed through the central processing unit of the computer or other programmable data processing apparatuses, an apparatus for implementing functions/actions specified in one or more blocks of the flowcharts and/or the block diagrams is generated. The computer-readable program instructions may also be stored in the computer-readable storage medium. The instructions enable the computer, the programmable data processing apparatus, and/or other devices to work in a specific manner, so that a computer-readable medium storing the instructions includes a manufactured product, which includes the instructions for implementing various aspects of the functions/actions specified in one or more blocks of the flowcharts and/or the block diagrams.

The flowcharts and the block diagrams in the drawings illustrate the architecture, functionality, and operation of possible implementations of the system, the method, and the computer program product according to the embodiments of the disclosure. In this regard, each block in the flowcharts or the block diagrams may represent a module, a program segment, or a part of an instruction. The module, the program segment, or a part of the instruction includes one or more executable instructions for implementing a specified logic function. In some alternative implementations, the functions noted in the blocks may also occur in an order different from the order noted in the drawing. For example, two consecutive blocks may actually be executed substantially concurrently or may sometimes be executed in the reverse order, depending upon the functionality involved. It is also noted that each block in the block diagrams and/or the flowcharts and combinations of blocks in the block diagrams and/or the flowcharts may be implemented by a special-purpose hardware-based system that may execute the specified function or action, or may be implemented by a combination of special-purpose hardware and computer instructions.

It should be understood that steps may be reordered, added, or deleted using the various forms of procedures shown above. For example, the steps described in the disclosure may be executed concurrently, sequentially, or in different orders, and no limitation is imposed herein as long as the desired result of the technical solution of the disclosure can be implemented.

The above specific implementations do not constitute a limitation on the protection scope of the disclosure. Persons skilled in the art should understand that various modifications, combinations, sub-combinations, and substitutions may be performed according to design requirements and other factors.

What is claimed is:

1. A method for executing computation, comprising:
   confirming, via a compiler, whether there is a call instruction related to a thread block modification request in a kernel function to be compiled;
   in response to confirming that there is the call instruction related to the thread block modification request in the kernel function to be compiled, determining a corresponding program segment associated with the call instruction;
   configuring a required thread resource for the corresponding program segment; and
   inserting a control instruction into the corresponding program segment to enable the thread resource configured for the corresponding program segment to execute relevant computation of the corresponding program segment, wherein an unconfigured thread resource does not execute the relevant computation,
   wherein enabling the thread resource configured for the corresponding program segment to execute the relevant computation of the corresponding program segment comprises:
   controlling an executive stream through a control flow code to encapsulate the corresponding program segment, so that when a thread identifier of a current thread is determined to belong to a thread block identifier set configured for the corresponding program segment, the current thread is used to execute the relevant computation of the corresponding program segment; and when the thread identifier of the current thread is determined to not belong to the thread block identifier set configured for the corresponding program segment, the current thread is skipped.

2. The method according to claim 1, wherein determining the corresponding program segment associated with the call instruction comprises:
   dividing the kernel function to be compiled into a plurality of corresponding program segments based on a number of call instructions.

3. The method according to claim 2, wherein configuring the required thread resource for the corresponding program segment comprises:
   configuring a required thread block and thread local register for each of the corresponding program segments.

4. The method according to claim 1, further comprising:
in response to confirming that a compiled kernel function is started, configuring a numbering of a thread block and assigning a thread local register based on a maximum number of threads required by the compiled kernel function, wherein the compiled kernel function comprises a plurality of corresponding program segments respectively inserted with the control instruction.

5. The method according to claim 1, further comprising:
in response to the control instruction of the corresponding program segment being called, performing followings:
synchronizing all threads of a thread block configured for the corresponding program segment;
allocating a thread local register for each of the threads of the configured thread block; and
reconfiguring a numbering of each of the threads, so that the reconfigured numbering is written to the assigned thread local register.

6. The method according to claim 1, further comprising:
starting, via a driver, a compiled kernel function;
confirming, via the compiler or the driver, a maximum number of threads required by the compiled kernel function; and
requesting, via the driver, the maximum number of threads from a graphics processor.

7. The method according to claim 1, wherein confirming whether there is the call instruction related to the thread block modification request in the kernel function to be compiled comprises:
scanning, via the compiler, the kernel function to be compiled to confirm whether the kernel function to be compiled comprises the call instruction related to the thread block modification request, wherein the call instruction related to the thread block modification request indicates a thread configuration required by the corresponding program segment.

8. A computing device comprising:
at least one processor; and
a memory, communicatively connected to the at least one processor, wherein
the memory stores an instruction executable by the at least one processor, the instruction is executed by the at least one processor, so that the at least one processor executes the method according to claim 1.

9. A non-transitory computer-readable storage medium, storing a computer program, wherein when the computer program is executed by a machine, the method according to claim 1 is executed.

10. A computing system, comprising:
a memory comprising a compiler module;
a central processor communicatively connected to the memory and comprising a driver module; and
a graphics processor communicatively connected to central processor and comprising an execution unit computation core module;
wherein the central processor is configured to execute the compiler module to identify a call instruction related to a thread block modification request comprised in a received kernel function to be compiled, and to convert the kernel function to be compiled of the call instruction to generate a compiled kernel function, wherein a corresponding program segment comprised in the compiled kernel function is configured with a control instruction;
wherein the central processor is configured to execute the driver module to determine a maximum number of threads required by the compiled kernel function to start based on the compiled kernel function; and
wherein the graphics processor is configured to execute the execution unit computation core module to modify a function call of a thread block in response to the control instruction of the corresponding program segment in the compiled kernel function being executed.

11. The computing system according to claim 10, wherein the compiler module is further configured to: when the kernel function to be compiled is confirmed to comprise the call instruction related to the thread block modification request, configure a required thread resource for the corresponding program segment associated with the call instruction; and insert the control instruction into the corresponding program segment to enable the thread resource configured for the corresponding program segment to execute relevant computation of the corresponding program segment, wherein an unconfigured thread resource does not execute the relevant computation.

12. The computing system according to claim 10, wherein modifying the function call of the thread block comprises: resuming or pausing a thread, and assigning a thread local register for each configured thread.

* * * * *